(12) United States Patent
Han et al.

(10) Patent No.: US 10,618,653 B2
(45) Date of Patent: Apr. 14, 2020

(54) CHARGING SYSTEM BY AUTONOMOUS GUIDE OF DRONE

(71) Applicant: Chan Hee Han, Gwangmyeong-si (KR)

(72) Inventors: Chan Hee Han, Gwangmyeong-si (KR); Gyu Sik Shin, Gwangmyeong-si (KR)

(73) Assignee: Chan Hee Han, Gwangmyeong-si (KR)

( * ) Notice: Subject to any disclaimer, the term of this patent is extended or adjusted under 35 U.S.C. 154(b) by 237 days.

(21) Appl. No.: 15/579,600

(22) PCT Filed: Mar. 15, 2016

(86) PCT No.: PCT/KR2016/002547
§ 371 (c)(1),
(2) Date: Dec. 5, 2017

(87) PCT Pub. No.: WO2016/200021
PCT Pub. Date: Dec. 15, 2016

(65) Prior Publication Data
US 2018/0141657 A1    May 24, 2018

(30) Foreign Application Priority Data

Jun. 10, 2015    (KR) .................. 10-2015-0081948

(51) Int. Cl.
*B64C 39/02* (2006.01)
*H02J 7/35* (2006.01)
(Continued)

(52) U.S. Cl.
CPC ............ *B64C 39/024* (2013.01); *B64C 39/02* (2013.01); *B64F 1/222* (2013.01); *H02J 7/00* (2013.01);
(Continued)

(58) Field of Classification Search
CPC ...... B64C 39/024; B64F 1/222; H02J 7/0047; H02J 7/025
See application file for complete search history.

(56) References Cited

U.S. PATENT DOCUMENTS 9,387,928 B1 * 7/2016 Gentry ................. B64C 39/024
2008/0174268 A1   7/2008 Koo et al.
(Continued)

FOREIGN PATENT DOCUMENTS

KR    10-2008-0060535 A    7/2008
KR       10-1118766 B1    3/2012
(Continued)

OTHER PUBLICATIONS

International Search Report for PCT/KR2016/002547 dated Jul. 25, 2016 from Korean Intellectual Property Office.

*Primary Examiner* — Michael D Lang
(74) *Attorney, Agent, or Firm* — Revolution IP, PLLC

(57) ABSTRACT

A charging system by autonomous guide of drone includes a drone for being autonomously guided to a charging station on the basis of location and altitude coordinates for charging and for transmitting a charged information to a control station when the charging is completed; a charging station for recognizing the approach of the drone within a chargeable range and for controlling the guide flight of the drone and transmitting a charged information to the control station when the charging is completed; and a control station for detecting the state of charge of the drone in real time and for transmitting a location coordinate and altitude coordinate of the charging station to the drone for guiding flight to the charging station.

11 Claims, 8 Drawing Sheets

(51) Int. Cl.
*H02J 7/02* (2016.01)
*H02J 7/00* (2006.01)
*H02J 50/80* (2016.01)
*B64F 1/22* (2006.01)

(52) U.S. Cl.
CPC ........ *H02J 7/0027* (2013.01); *H02J 7/00036* (2020.01); *H02J 7/0047* (2013.01); *H02J 7/02* (2013.01); *H02J 7/025* (2013.01); *H02J 7/35* (2013.01); *H02J 50/80* (2016.02); *B64C 2201/066* (2013.01); *B64C 2201/141* (2013.01)

(56) References Cited

U.S. PATENT DOCUMENTS

| | | | |
|---|---|---|---|
| 2016/0009413 A1 | 1/2016 | Lee et al. | |
| 2016/0347450 A1* | 12/2016 | Raniere | B64C 39/024 |
| 2017/0210470 A1* | 7/2017 | Pardell | B08B 1/006 |

FOREIGN PATENT DOCUMENTS

| | | |
|---|---|---|
| KR | 10-2013-0122715 A | 11/2013 |
| KR | 10-2014-0078251 A | 6/2014 |
| KR | 10-1494341 B1 | 2/2015 |

\* cited by examiner

CHARGING SYSTEM BY AUTONOMOUS GUIDE OF DRONE

TECHNICAL FIELD

The present invention relates to a charging system by autonomous guide of a drone.

In particular, the present invention is directed to solving the problem related to the charging of the electric power of the drone which is the cause of shortening flight time of the drone.

The present invention is directed to a system in which the drone is guided to a charging station autonomously or remotely for charging and normally flying after being detached from the charging station when the charging is completed.

BACKGROUND OF THE INVENTION

At present, the most problematic of unmanned aero vehicle, for example drone, is the possibility of injury or property damage caused by falling in flight. The biggest reason for this is the charging problem.

This problem causes the drone to be unable to perform the scheduled route flight.

Therefore, a technique to solve the charging problem of the drone is needed.

Currently, charging for the drone is systemized so that it can only be done after landing on the ground. Therefore, there is a need for a manager to manage the charge.

Korean Unexamined Patent Publication No. 10-2014-0078251 is disclosed as a specific conventional technology for charging a unmanned aero vehicle.

A charging electrode disposed on one side of aero vehicle is connected to a rechargeable battery of the drone, and a supply electrode disposed on the ground surface is brought into contact with the rechargeable battery so that the charging electrode is charged when the aero vehicle is landed.

When the aero vehicle is landed, the charging electrode disposed on the bottom of the support of the aero vehicle and connected to the rechargeable battery, and the supply electrode connected to the power supply unit disposed on one side while being exposed to the ground surface are brought into contact with each other to charge the rechargeable battery of the aero vehicle.

When the aero vehicle is landed, the charging electrode installed on the aero vehicle and the supply electrode exposed on the ground surface are brought into contact with each other to transfer the power to the rechargeable battery.

Such a charging method is easy to charge and it is possible to charge a plurality of aero vehicles simultaneously.

However, since a structure in which the aero vehicle is landed for charging needs to be added, there is a disadvantage that the technology is complicated. Furthermore, the technique of moving to the charger by autonomous guide is not disclosed, and the remotely controlled charging technique is not applied.

SUMMARY OF THE INVENTION

The present invention has been made in view of the problems associated with the related art as described above, and it is an object of the present invention to provide an charging system by autonomous guide of drone in that the drone can be guided to a charging station for charging by communicating between the drone and the charging station or between the drone and a control station, It is another object of the present invention to provide an charging system by autonomous guide of drone which provides IoT (Internet of Things) function to the drone and autonomously guides to a charging station to enable automatic charging.

It is other object of the present invention to provide a charging system by autonomous guide of drone in which a hangar for charging and storage of the drone is installed so that it can be used conveniently.

In order to achieve the above objects the present invention provides a charging system by autonomous guide of drone comprising:

a drone for being autonomously guided to a charging station on the basis of location and altitude coordinates for charging and for transmitting a charged information to a control station when the charging is completed;

a charging station for recognizing the approach of the drone within a chargeable range and for controlling the guide flight of the drone and transmitting a charged information to the control station when the charging is completed; and a control station for detecting the state of charge of the drone in real time and for transmitting a location coordinate and altitude coordinate of the charging station to the drone for guiding flight to the charging station.

2. The charging system in accordance with claim 1, wherein said drone comprises:

a control unit for controlling the drone to fly to the charging station under the control of the control station or to fly to the charging station by communicating with the charging station;

a receiving unit for receiving a control signal transmitted from the control station or the charging station for charging;

a transmitting unit for transmitting a flight signal to the control station or the charging station;

a guiding unit for receiving a radio signal from the control station or the charging station and for allowing the drone to be autonomously guided to the charging station;

a displaying unit for displaying a state in which charging is performed;

a charging unit for charging the electric power supplied from the charging station to the drone; and a buffering unit for preventing mechanical breakage due to the physical contact between the drone and the charging station when the drone is charged by the wired lines at the charging station.

The guiding unit transmits one signal of infrared rays, laser beams, and RF signals to the charging station.

The charging unit charges the electric power to the drone by electromagnetic induction or magnetic resonance.

The charging station comprises:

a control unit for controlling the drone to be flied to the charging station for charging under a control of the control station or by communication with the drone;

a receiving unit for receiving a guide flight signal transmitted from the control station or the drone for charging;

a transmitting unit for transmitting a guide flight signal to the drone or the control station for charging;

a guiding unit for transmitting a radio signal to the drone to be autonomous guided to the charging station;

a displaying unit for displaying a state in which charging is performed;

a charging unit for charging the electric power to the drone; and a buffering unit for preventing mechanical breakage due to physical contact between the drone and the charging station when the charging of the drone is performed by wire.

The guiding unit transmits a signal of infrared rays, laser beams, and RF signals to the charging station.

The guiding unit comprises two electrode plates having a main signal transmitter and an auxiliary signal transmitter for guiding the drone to the charging station, said main signal transmitter transmits a signal at a large angle and said auxiliary transmitter transmits a signal at a small range so that the drone can be docked with the charging station.

The charging unit charges the electric power to the drone by electromagnetic induction or magnetic resonance.

The drone reserves a flight plan at the control station and flies according to the flight plan under a control of the control station.

The charging station comprises a hangar so that the drone can be stored or be charged.

The hangar comprises:

a control unit;

a communicating unit for communicating with the drone or the control station;

a door unit for being opened or closed for charging and storing the drone;

a fixing unit for fixing the aero vehicle;

a electric power generating and storing unit for converting solar light to electric power;

a sensing unit for sensing and manages the wind direction, rain, thunderstorm, temperature, charging status, and charge amount to determine whether the flight of the drone is possible; and a memory for storing data processed by the control unit.

The hangar has waterproof function.

Effect of the Invention

According to the present invention, a drone is guided to a charging station through the communication between the drone and the charging station or between the drone and a control station so that the drone can be charged, and accordingly, it is possible to prevent the problem that the normal flight can not be performed due to the power consumption which may occur during the flight of the drone.

In addition, according to the present invention, it is possible to fly and charge the drone by providing the Internet of Things function, and the charging and related operations can be performed automatically.

In addition, according to the present invention, a hangar for charging and storing the drone is installed and can be conveniently used, and a configuration for storing and converting sunlight into electricity and a communication function with the control station are provided, and accordingly, it is an advantage of being able to effectively control the drone for charging.

DESCRIPTION OF THE PREFERRED EMBODIMENTS

Hereinafter, embodiments of the present invention will be described in detail with reference to the accompanying drawings.

Figure 1:
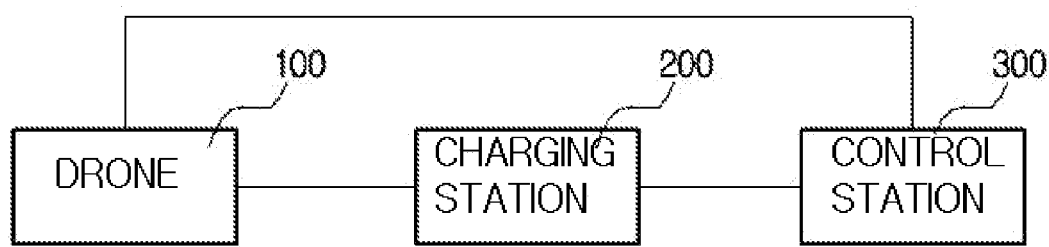
FIG. 1 is a conceptual diagram of the present invention.

As shown in FIG. 1, a charging system by autonomous guide of drone according to the present invention includes a drone (including an unmanned aero vehicle) 100 and a charging station 200 and a control station 300 so that the drone 100 is guided to the charging station 200 by the communication therebetween or so that the drone 100 is guided to the charging station 200 under the control of the control station 300 for charging. These operations are selectively performed.

Figure 2:
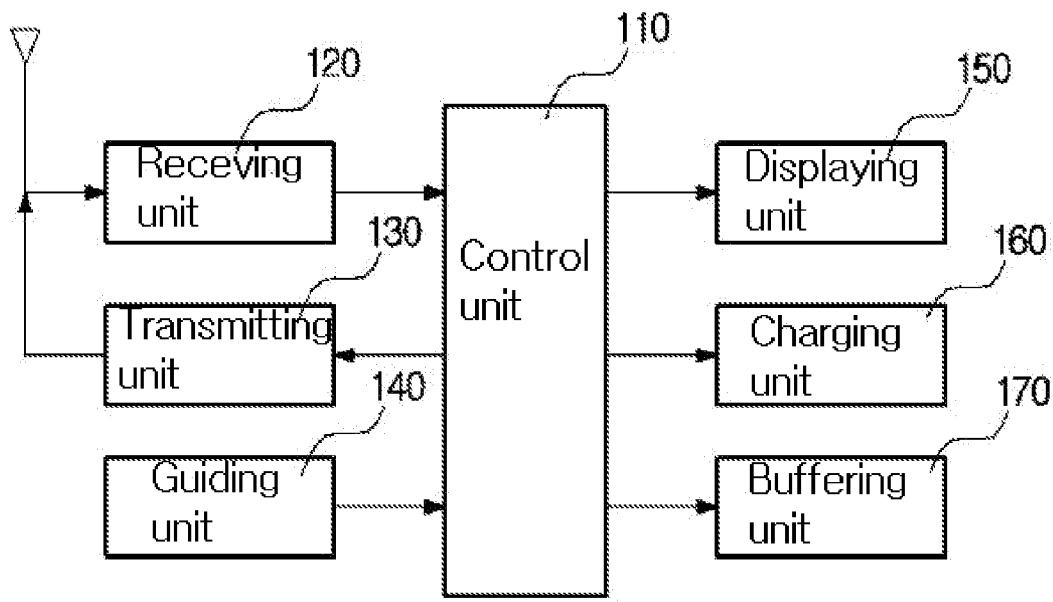
FIG. 2 is a control configuration diagram of a drone configured in FIG. 1.

As shown in FIG. 2, the drone 100 includes a control unit 110, a receiving unit 120, a transmitting unit 130, a guiding unit 140, a display unit 150, a charging unit 160, and a buffering unit 170.

The control unit 110 controls operations related to the flying and charging of the drone 100.

The control unit 110 controls the drone 100 to fly to the charging station 200 under the control of the control station 300 or to fly to the charging station 200 by communicating with the charging station 200.

The receiving unit 120 receives signals transmitted from the control station 300 or the charging station 200.

The signal transmitted from the control station 300 to the drone 100 may include a control signal for controlling the flight of the drone 100 and a guide flight control signal for guiding the drone 100 to the charging station 200.

Also, the signal transmitted from the charging station 200 to the drone 100 may include a guide flight control signal to guide the drone 100 to the charging station 200.

The transmitting unit 130 transmits signals to the control station 300 or the charging station 200 from the drone 100.

The signal transmitted from the drone 100 to the control station 300 may include a current flight position signal and a guide flight signal such as a guide flight to the charging station 200 for charging, a charging time and a charging amount signal.

The signal transmitted from the drone 100 to the charging station 200 may include a current flight position signal and a guide flight signal such as a guide flight to the charging station 200 for charging.

The guiding unit 140 allows the drone 100 to be autonomously guided to the charging station 200.

The autonomous guide is made possible by, for example, radio signals such as infrared rays, laser beams, and RF signals.

The charging station 200 should be provided with a configuration corresponding to the guide configuration of the drone 100.

The displaying unit 150 displays a state in which charging is performed, for example, charging, charging completion, and the like.

The displaying unit 150 may be composed of, for example, LED.

The charging unit 160 charges the electric power supplied from the charging station 200 to the drone 100.

Figure 7A:
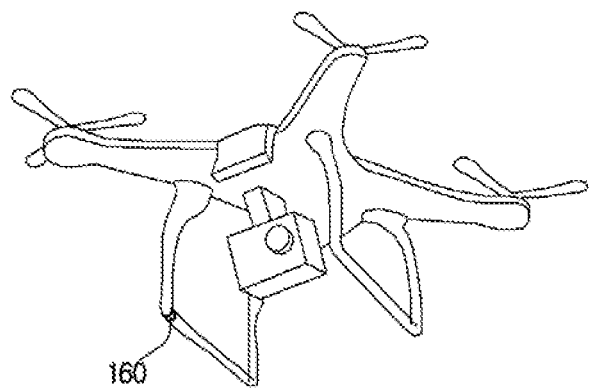
FIG. 7A shows an wired charging unit of the drone of the present invention.

As shown in FIG. 7A, the charging unit 160 is configured to be capable of wired and wireless charging by configuring on the bottom contact surface of the leg.

For wired charging, a contact terminal for contacting with the charging part of the charging station 200 should be configured.

In addition, for wireless charging, electromagnetic induction or magnetic resonance charging should be possible.

Figure 7B:
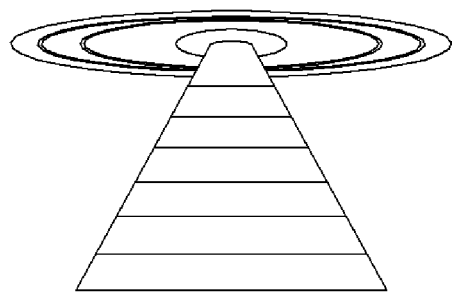
FIG. 7B shows an wireless charging unit of the drone of the present invention.

For this, an wireless charging unit may be configured as shown in FIG. 7B.

On the other hand, it is possible for the drone 100 to automatically ground by its weight when landing at the charging station 200.

The buffering unit 170 prevents mechanical breakage due to the physical contact between the drone 100 and the charging station 200 when the drone 100 are charged by the wired lines at the charging station 200.

The buffering unit 170 may be formed of a spring, a sponge, or the like to mitigate the impact upon contact between the drone 100 and the charging part.

Figure 3:
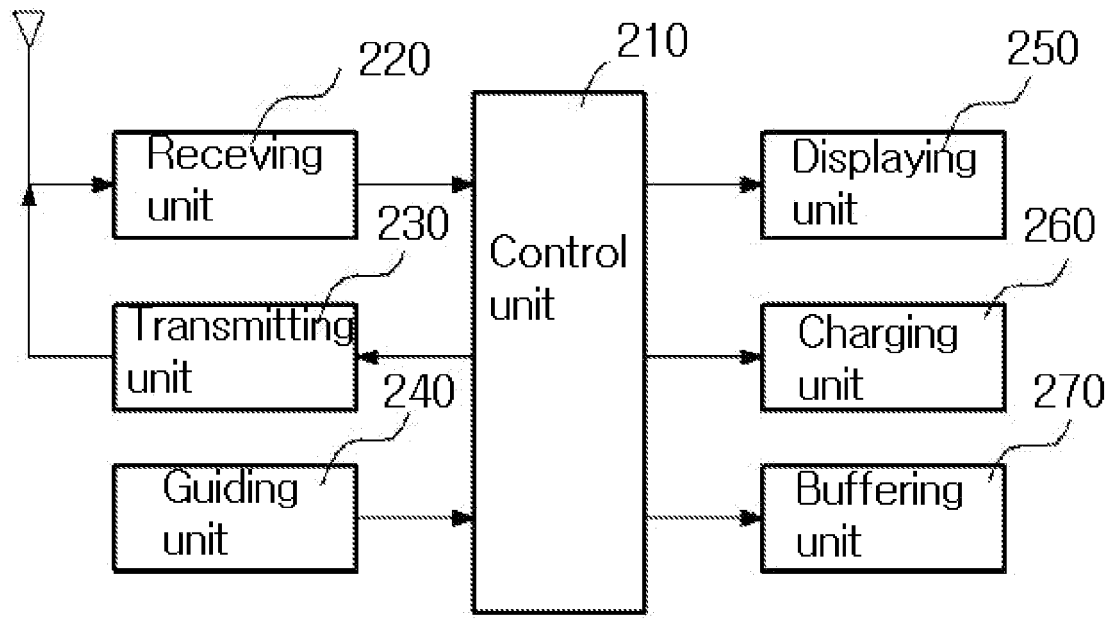
FIG. 3 is a control configuration diagram of a charging station configured in FIG. 1.

As shown in FIG. 3, the charging station 200 is installed on the roof of the building or at the antenna and includes a control unit 210, a receiving unit 220, a transmitting unit 230, an guiding unit 240, a displaying unit 250, a charging unit 260, and a buffering unit 270.

The control unit 210 processes a control signal transmitted from the control station 300 and transmits the control signal to the drone 100 thereby controlling charging of the drone 100.

The control unit 210 controls the drone 100 to be guided to the charging station 200 by communication with the drone 100.

The control unit 210 also recognizes the drone 100 when the drone 100 approaches the charging station 200 without control of the control station 300 and transmits a guide flight control signal to the charging station 200 to transmit it to the drone 100.

The receiving unit 220 receives signals transmitted from the control station 300 or the drone 100.

The signal transmitted from the control station 300 may include a charge control signal for the drone 100 and a charge time and a charge amount information request signal for the drone 100.

The signal transmitted from the drone 100 may include a current flight position signal and a reach time signal at the charging station 200.

The transmitting unit 230 transmits signals to the drones 100 or the control station 300.

The signal transmitted from the transmitting unit 230 to the drone 100 may include a guide flight control signal to guide the drone 100 to the charging station 200 for charging.

The signal transmitted from the transmitting unit 230 to the control station 300 may include a position signal of the charging station 200 and a guide flight signal that the drone 100 is guided to the charging station 200 and a charge time and a charge amount information request signal for the drone 100.

The guiding unit 240 operates so that the drone 100 is autonomously guided.

The autonomous guide can be performed by radio function such as infrared rays, laser, and RF, as well as the induction part configured in the drone 100.

The displaying unit 250 displays a state in which charging is performed, for example, charging, charging completion, and the like.

The displaying unit 250 may be composed of, for example, LED.

The charging unit 260 charges the electric power to the drone 100.

Figure 8A:
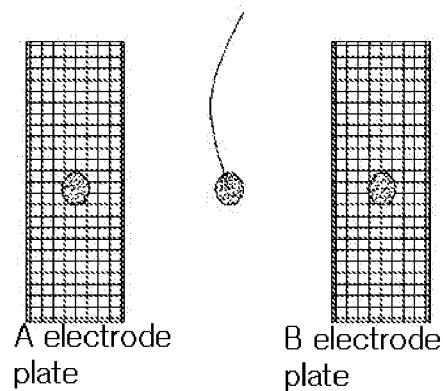
FIGS. 8A and 8B are views showing the charging principle of the present invention.
Figure 8B:
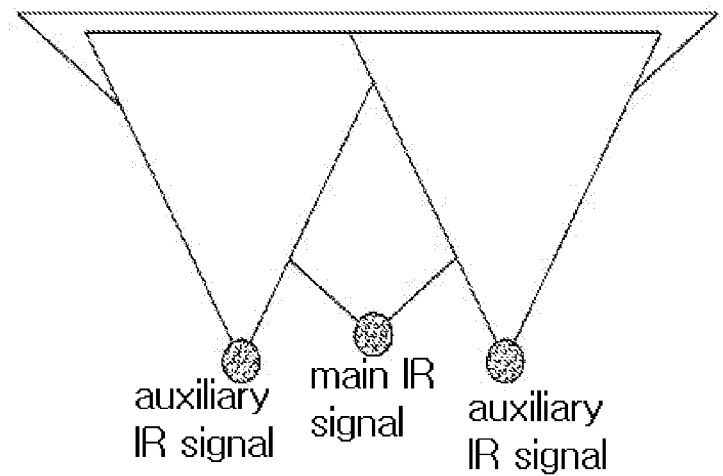

As shown in FIGS. 8A and 8B, the charging unit 260 is configured to enable wire charging through the bottom contact terminal of the leg configured in the drone 100.

The charging unit 260 is configured to protrude a plurality of contact terminals so that even if a slight error occurs in the docking of the charging station 200 of the drone 100, these terminals can be contacted to enable wire charging.

In case of wireless charging, electromagnetic induction and magnetic resonance charging are possible.

For this purpose, IR signal can be transmitted at the center of the electrode plate and the periphery of the center of each electrode plate. The electrode plate is divided into two parts, and auxiliary IR transmitter unit is formed on each of the separated electrode plates to radiate a guide flight signal for accessing the drones 100.

Therefore, the drone 100 approaches the charging station 200 in accordance with the GPS signals (including the X, Y coordinates and the Z coordinate of the altitude coordinate) in order to recognize the location of the charging station 200. Thereafter, it captures the main IR signal, which is emitted at a large angle, and attempts to dock to the charging station 200. During the docking, the auxiliary IR signal is captured and precisely repositioned and landed on the charging plate formed in the charging unit 260 of the charging station 200.

The auxiliary IR signal should be included within the angular range of the main IR signal that is widely radiated to allow precise docking.

The charging electrode plate is configured to include an approximate range, and a plurality of terminals are configured to facilitate terminal contact after landing.

Figure 9:
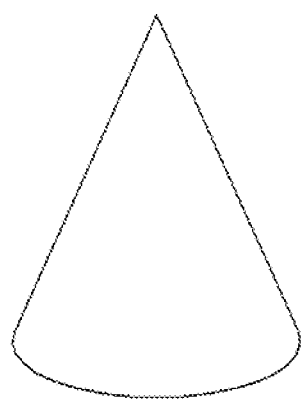
FIG. 9 is the shape of a charger of the present invention.

Since the electrode plate is exposed to the outside, it is preferable to make it possible to allow rainwater to escape from rain or snow, and to include, for example, hot wires for melting snow For wireless charging, a conical wireless charger may be configured as shown in FIG. 9.

The buffering unit 270 prevents mechanical breakage due to physical contact between the drone 100 and the charging station 200 when the charging of the drone 100 is performed by wire.

The buffering unit 270 may be formed of a spring, a sponge, or the like for shock-absorbing.

On the other hand, the drone 100 are protected from rain, snow, dust, etc. by a drone hangar that can be installed adjacent to the charging station 200, and can perform state inspection through communication with the control station 300 and can be configured to be able to charge without external power through self-produced electric power by the solar light.

The hangar includes a control unit, a communicating unit for communicating with the drone 100 or the control station 300, and a door unit which allows charging in a closed state after being opened when the drone 100 is approached to the charging station 200 and reopened when the charging is completed, thereby allowing the drone 100 to escape.

The hangar also includes a fixing part for fixing the drone 100 by a wire, a magnet, a locking or the like when there is a concern that the hanging part is installed on a marine buoy and is largely moved by a typhoon or a storm, and a power storage unit for storing the produced electric power and storing electric power by using a roof of the hangar as a solar panel without external power supply, storing the electric power in a storage device which can be configured inside and outside the hangar, and a sensing unit for measuring various types of sensing functions for determining whether or not the drone 100 is capable of flying, the direction of charging, the state of charge, the amount of charge and the direction of the drone, and a memory for storing the data processed by the control unit.

The hangar also has a waterproof function, for example, to prevent charging and storage of drone 100 in case of rain.

Figure 4:
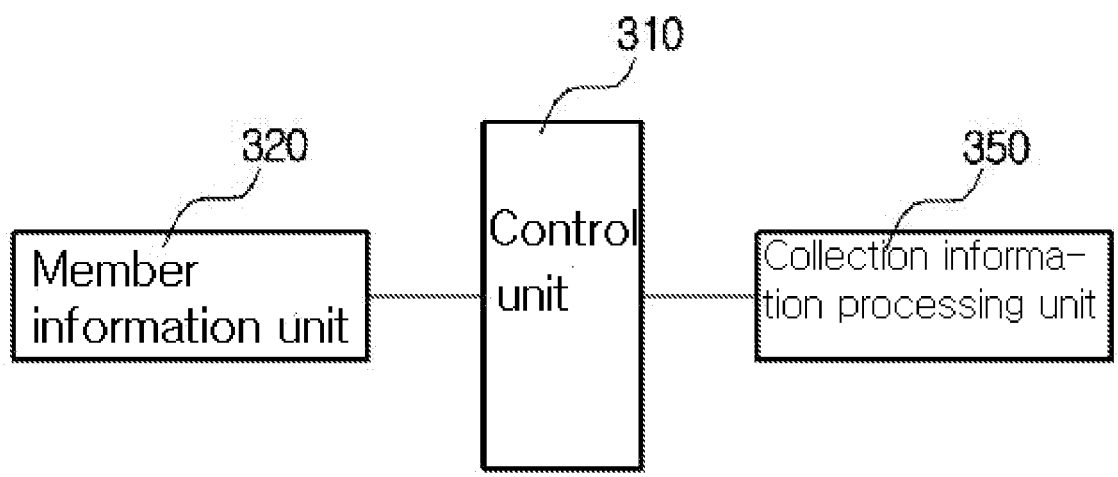
FIG. 4 is a control configuration diagram of the control station configured in FIG. 1.
Figure 5:
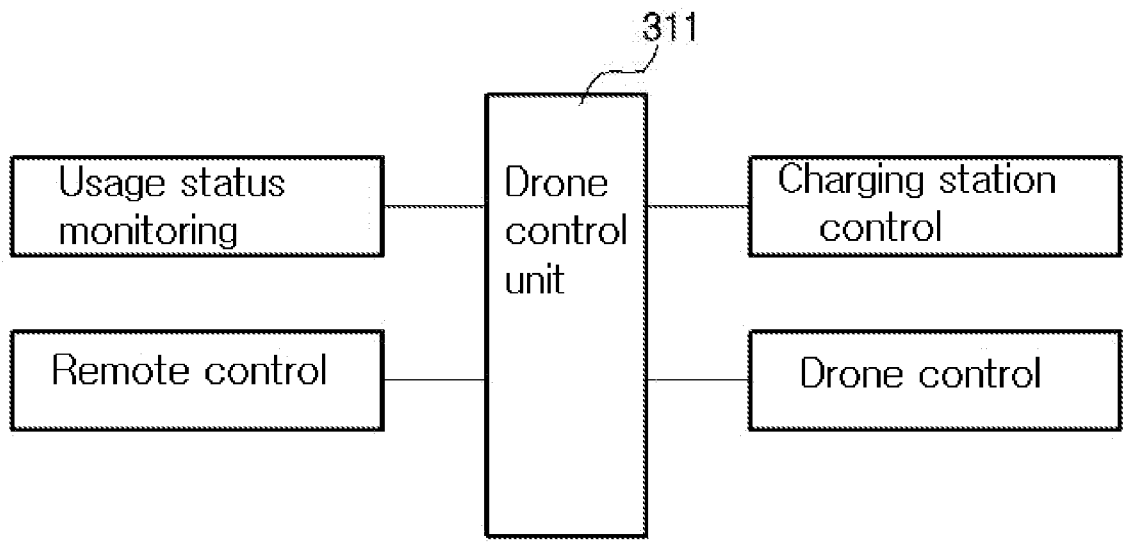
FIG. 5 is a control configuration diagram of the charging control unit configured in FIG. 4.
Figure 6:
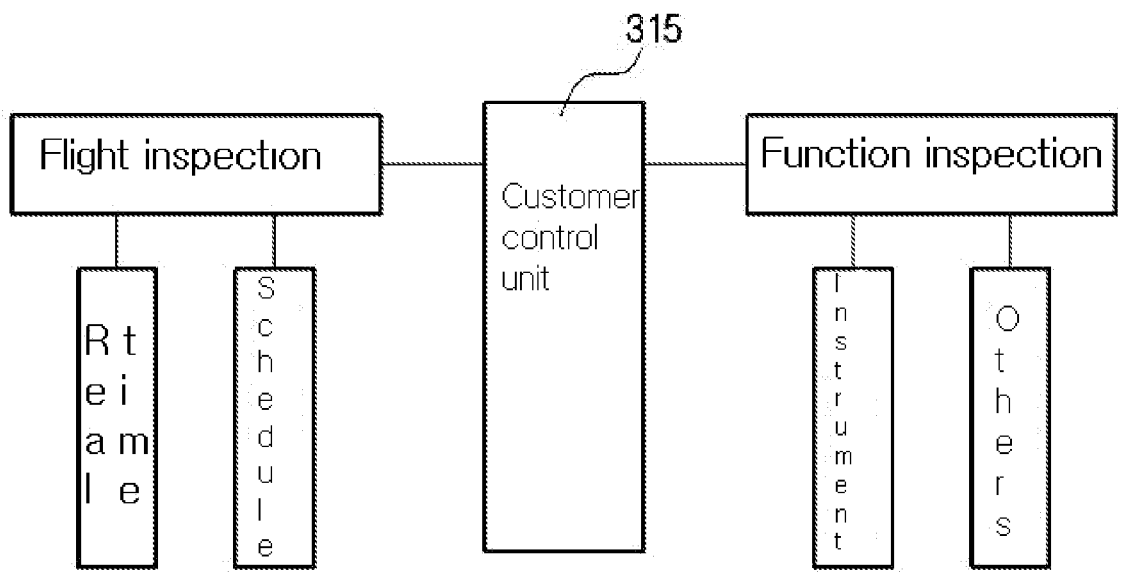
FIG. 6 is a control configuration diagram of the customer control unit configured in FIG. 1.

The control station 300 includes a control unit 310, a member information unit 320, and a collection information processing unit 330 as shown in FIG. 4.

The member information unit 320 includes a DB for registered drone information, membership information as an owner thereof, and information related to service charges using the present invention charging system, that is, authentication, settlement, and collection.

The control unit 310 determines the position of each charging station 200 and determines which charging station is currently charging the drones 100, and determines the available charging station.

In addition, the control unit 310 collectively controls the authentication, billing, collection, settlement information, location of the drone, charge time, charge amount, presence of charge abnormality, docking and separation of the drone and the charging station and flight plan.

The control unit 310 includes a charging control unit 311 and a customer control unit 315.

The charging control unit 311 controls the drone 100 and the charging station 200 for charging and the docking of the drone 100 to the charging station 200.

The charging control unit 311 monitors whether or not the drone 100 is currently being charged, the position of the charging station being charged, the charging information, the overcurrent, and the occurrence of a fault such as a short circuit.

The customer control unit 315 comprises a flight inspection and a loading function inspection.

The flight inspection is to inspect the operation, direction and destination of the drone of the customer (for example, drone owner). The flight inspection includes a real-time inspection and a schedule inspection. The schedule inspection such as delivery and reconnaissance is performed by setting up the regular observation of the reservation area in advance.

The loading function inspection is to inspect various functions mounted on the drone 100 irrespective of the state of the actual flight of the drone 100 and to inspect, for example, to control and monitor through interfaces with cameras, microphones, and other devices.

The collection information processing unit 330 stores, classifies, collects, retrieves, and transmits data received through various sensors and information collecting apparatuses mounted on the drone 100.

The collection information processing unit 330 includes a collection DB system and an external interface unit for transmitting the collected data to the outside.

The external interface unit allows all of the above functions and data gathered through the above functions to be displayed by a PC web and a smartphone application of an authorized external user.

For example, the Map server provides the map and satellite photographs showing the drone 100 on the basis of position information and all monitoring signal.

The charging system according to the present invention having the autonomously guided to the charging station 200 can be used for communication between the drone 100 and the charging station 200 through laser, infrared communication, short distance communication (Bluetooth, RFID, NFC, Zigbee, etc.) and long distance communication (2G, 3G, 4G, 5G, etc.).

Long-range wireless communication may be applied between the drone 100 and the control station 300 and wired/wireless communication (Wi-Fi, @ G, wired communication, etc.) capable of long distance communication may be applied between the charging station 200 and the control station 300.

According to the present invention, when a flight reservation is made to the control station 300 according to the purpose of flying the drone 100 it can be set to enable autonomous flight.

For example, in the case of the courier service, when the goods are received at the point A and then delivered to the point B, the nearest charging station is searched under the control of the control station 300 to charge the battery in flight to the point C. After that, the drone 100 flies to point D again and pick up the delivery package, and then flies to E for delivery.

Figure 10:
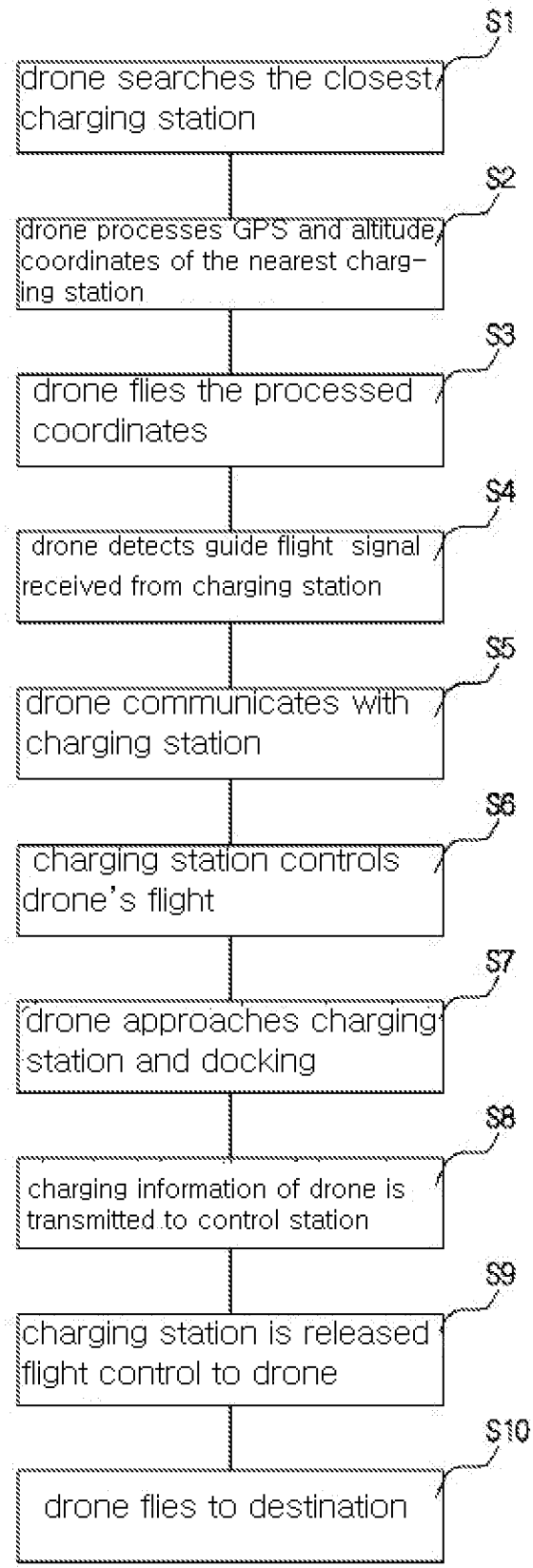
FIG. 10 is a flowchart illustrating the operation of the drone of the present invention to autonomously guide flight to a charging station.

FIG. 10 is a flowchart illustrating the operation of the drone of the present invention to autonomously guide flight to a charging station.

The drone 100 determines the current position in flight and searches for the closest charging station 200(S1). The search may be performed under the control of the control station 300. The control unit 110 processes the GPS coordinate and altitude coordinate of the nearest charging station 200 transmitted from the control station 300(S2) so that the drone 100 elevates to the coordinate of the charging station 200(S3).

The drone 100 detects through the guiding unit 140 whether the guide flight signal is received from the charging station 200 while flying at the position coordinate and the altitude coordinates of the charging station 200 transmitted from the control station 300(S4).

When the guide flight signal transmitted from the charging station 200 is detected by the guiding unit 140, the detection signal is input to the control unit 110. Thereafter, communication is established between the drone 100 and the charging station 200 under the control of the control unit 110(S5).

When the communication between the drone 100 and the charging station 200 becomes possible, the charging station 200 controls the flight of the drone 100, and the charging station 200 transmits the guide flight signal to the drone 100 through the guiding unit 240.

The guide flight signal transmitted from the charging station 200 is continuously detected by the guiding unit 140 of the drone 100 and the drone 100 is guided to the charging station 200 by the control of the control unit 110(S6).

The drone 100 guided to the charging station 200 is docked with the charging station 200.

The charging for the drone 100 is performed through the charging unit 160 of the drone 100 and the charging unit 260 of the charging stations 200 when the charging station 200 and the drone 100 are docked. This enables the wired or wireless connection to be selectively enabled, as described above (S7).

The charging state is displayed through the displaying unit 150 of the drone 100 and the displaying unit 250 of the charging station 200 during charging.

The signal input from the charging unit 160 is processed by the control unit 110 of the drone 100 and the signal input from the charging unit 260 is processed by the control unit 210 of the charging station 200 during charging, and the charging signal are transmitted to the control station 300. That is, the charging signal are transmitted to the control station 300 through the transmitting unit 130 of the drone 100 or the transmitting unit 230 of the charging station 200(S8).

The charging operation is displayed on the display unit 150 under the control of the control unit 110 of the drone 100 and displayed on the display unit 250 under the control of the control unit 210 of the charging station 200, and a completion signal is transmitted to the control station 300 through the transmitting unit 130 of the drone 100 or the transmitting unit 230 of the charging station 200.

The control unit 210 controls the guiding unit 240 of the charging station 200 to prevent the guide flight signal from being radiated to the drone 100 so that the flight control of the drone 100 by the charging station 200 is released. Otherwise, the flight control of the charging station 200 is automatically released by the flight of the drone 100 to predetermined position coordinate and altitude coordinate (S9).

Thereafter, the drone 100 continue to fly according to purpose (S10).

Figure 11:
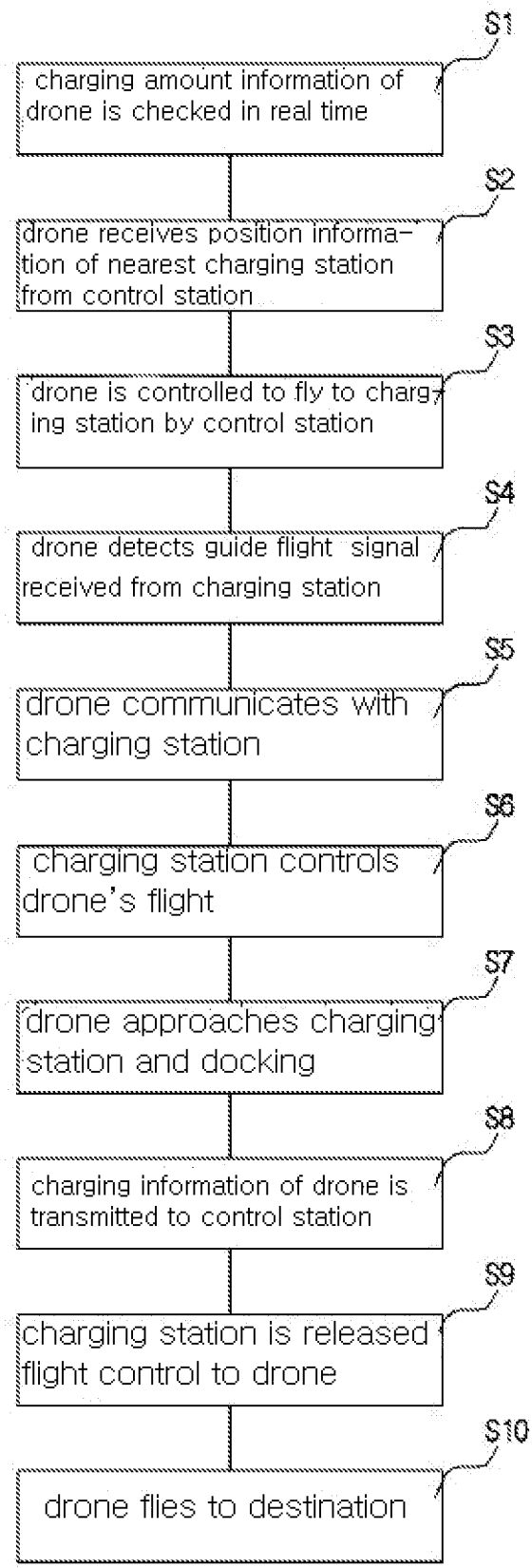
FIG. 11 is a flowchart illustrating an operation of guiding the drone to the charging station under the control of the control station of the present invention.

FIG. 11 is a flowchart illustrating an operation of guiding the drone to the charging station under the control of the control station of the present invention.

The control station 300 checks the charging amount information of the drone 100 in the vicinity of the charging station 200 in real time. The confirmation is made possible by real-time transmission of the charge amount information to the control station 300 through the transmitting unit 130 of the drone 100.

When it is determined that charging of the drone 100 is necessary as a result of processing the charged amount information of the drone 100 by the control station 300, the control station 300 transmits the position coordinate and the altitude coordinate of the nearest charging station 200 to the drone 100.

Therefore, the drone 100 receives the position coordinate and the altitude coordinate of the nearest charging station 200 transmitted from the control station 300 through the receiving unit 120 to be processed by the control unit 110 and fly to the above-mentioned coordinates.

The guiding unit 140 detects whether the guide flight signal transmitted from the charging station 200 is received while the drone 100 is flying at the position coordinate and the altitude coordinate of the charging station 200 transmitted from the control station 300.

When the guide signal transmitted from the charging station 200 is detected by the guiding unit 140, the detection signal is input to the control unit 110 and processed. Then, under the control of the control unit 110, the communication between the drone 100 and the charging station 200 is performed.

When the communication between the drone 100 and the charging station 200 becomes possible, the charging station 200 controls the flight of the drone 100, and the charging station 200 transmits the guide flight signal to the drones 100 through the guiding unit 240.

The guide flight signal transmitted from the charging station 200 is continuously detected by the guiding unit 140 of the drone 100 and then continuously processed by the control unit 110 so that the drone 100 is controlled by the control unit 110, and is guided to the charging station 200.

The drone 100 guided to the charging station 200 is docked with the charging station 200.

The charging of the drone 100 is performed through the charging unit 160 of the drone 100 and the charging unit 260 of the charging stations 200 when the charging station 200 and the drone 100 are docked.

The charging state is displayed through the displaying unit 150 of the drone 100 and the display unit 250 of the charging station 200 during charging.

The signal input from the charging unit 160 is processed by the control unit 110 of the drone 100 and the signal input from the charging unit 260 is processed by the control unit 210 of the charging station 200 during charging, and the charging signal is transmitted to the control station 300. That is, the charging signal is transmitted to the control station 300 through the transmitting unit 130 of the drone 100 or the transmitting unit 230 of the charging station 200.

The charging operation is displayed on the display unit 150 under the control of the control unit 110 of the drone 100 and displayed on the display unit 250 under the control of the control unit 210 of the charging station 200, and a completion signal is transmitted to the control station 300 through the transmitting unit 130 of the drone 100 or the transmitting unit 230 of the charging station 200.

The control unit 210 controls the guiding unit 240 of the charging station 200 to prevent the guide flight signal from being radiated to the drone 100 so that the flight control of the drone 100 by the charging station 200 is released. Otherwise, the flight control of the charging station 200 is automatically released by the flight of the drone 100 to predetermined position coordinate and altitude coordinate.

Thereafter, the drone 100 continues to fly according to purpose.

Figure 12:
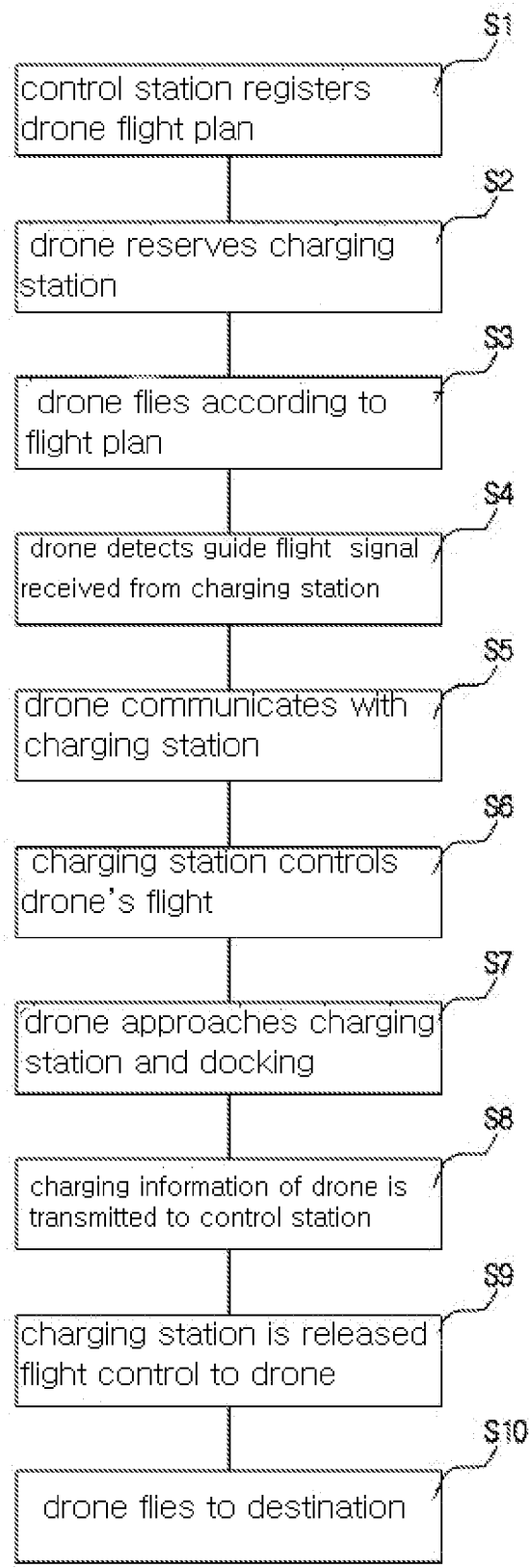
FIG. 12 is a flowchart of an operation of the drone flight of the present invention in accordance with a schedule reserved in the control station.

FIG. 12 is a flowchart of an operation of the drone flight of the present invention in accordance with a schedule reserved in the control station.

The flight plan (flight path, flight time, etc.) of the drone 100 is reserved in the control station 300.

In addition, the drone 100 reserves the charging station 200 to be charged during flight.

The reservation of the charging station 200 is made in consideration of the fact that battery charging is not necessarily required and that a situation may occur in which the battery is charged in advance for safety. The reservation is made by preliminarily determining the degree of battery consumption during flight based on, for example, flight path and flight time. The reservation information is stored and managed in the control station 300.

As shown in FIGS. 10 and 11, the control station 300 receives the charge amount information from the drone 100 in flight in real time, and processes it, and determines whether charging is necessary. The control station 300 transmits the positional information of the nearest charging station 200 on the current flight position to the drone 100 and causes the drone 100 to be self-guided to the charging station 200 for charging.

The drone 100 flies according to the reserved plan or charging plan in a state where the flight plan and the charging plan of the drone 100 are stored and managed in the control station 300.

In this state, the guiding unit 140 continuously detects whether there is a guide flight signal transmitted from the charging station 200. The guide flight signal from the charging station 200 detected by the guiding unit 140 is transmitted to the control unit 110. And the communication between the drone 100 and the charging station 200 is performed under the control of the control unit 110 that has processed them.

When the communication between the drone 100 and the charging station 200 becomes possible, the charging station 200 controls the flight of the drone 100. The charging station 200 continuously transmits the guide flight signal to the drone 100 through the guiding unit 240 so that the guide flight signal from the charging station 200 is transmitted to the guiding unit 140 of the drone 100 so that it is detected continuously. The guide flight signal is continuously processed by the control unit 110 and the drone 100 is guided to the charging station 200 under the control of the control unit 110.

The drone 100 guided to the charging station 200 is docked with the charging station 200.

The charging of the drone 100 is performed through the charging unit 160 of the drone 100 and the charging unit 260 of the charging station 200 when the charging station 200 and the drones 100 are docked.

The charging state is displayed through the displaying unit 150 of the drone 100 and the displaying unit 250 of the charging station 200 during charging.

The signal input from the charging unit 160 is processed by the control unit 110 of the drone 100 and the signal input from the charging unit 260 is processed by the control unit 210 of the charging station 200 during charging, and the charging signal is transmitted to the control station 300. That is, the charging signal is transmitted to the control station 300 through the transmitting unit 130 of the drone 100 or the transmitting unit 230 of the charging station 200.

The charging operation is displayed on the display unit 150 under the control of the control unit 110 of the drone 100 and displayed on the display unit 250 under the control of the control unit 210 of the charging station 200, and a completion signal is transmitted to the control station 300 through the transmitting unit 130 of the drone 100 or the transmitting unit 230 of the charging station 200.

The control unit 210 controls the guiding unit 240 of the charging station 200 to prevent the guide flight signal from being radiated to the drone 100 so that the flight control of the drone 100 by the charging station 200 is released. Otherwise, the flight control of the charging station 200 is automatically released by the flight of the drone 100 to predetermined position coordinate and altitude coordinate.

Thereafter, the drone 100 continues to fly according to the flight schedule.

INDUSTRIAL AVAILABILITY

The present invention is directed to a system in which the drone is guided to a charging station autonomously or remotely for charging and normally flying after being detached from the charging station when the charging is completed. The present is useful for drone charging and charging control techniques.

What is claimed is:

1. A charging system by autonomous guide of drone comprising:
   a drone for being autonomously guided to a charging station on the basis of location and altitude coordinates for charging and for transmitting a charged information to a control station when the charging is completed;
   a charging station for recognizing the approach of the drone within a chargeable range and for controlling the guide flight of the drone and transmitting a charged information to the control station when the charging is completed; and
   the control station for detecting the state of charge of the drone in real time and for transmitting a location coordinate and altitude coordinate of the charging station to the drone for guiding flight to the charging station,
   wherein the charging station comprises a charging unit for charging the electric power to the drone,
   wherein the charging unit comprises:
      two electrode plates being separated and exposed to the outside;
      a main signal transmitter formed between the two electrode plates and transmitting a signal at a large angle; and
      an auxiliary signal transmitter formed on each of the two electrode plates and transmitting a signal at a small angle; and
   wherein a signal transmission area of the auxiliary signal transmitter is located within a signal transmission area of the main signal transmitter.

2. The charging system in accordance with claim 1, wherein said drone comprises:
   a control unit for controlling the drone to fly to the charging station under the control of the control station or to fly to the charging station by communicating with the charging station;
   a receiving unit for receiving a control signal transmitted from the control station or the charging station for charging;
   a transmitting unit for transmitting a flight signal to the control station or the charging station;
   a guiding unit for receiving a radio signal from the control station or the charging station and for allowing the drone to be autonomously guided to the charging station;
   a displaying unit for displaying a state in which charging is performed;
   a charging unit for charging the electric power supplied from the charging station to the drone; and
   a buffering unit for preventing mechanical breakage due to the physical contact between the drone and the charging station when the drone is charged by the wired lines at the charging station.

3. The charging system in accordance with claim 2, wherein said guiding unit transmits one signal of infrared rays, laser beams, and RF signals to the charging station.

4. The charging system in accordance with claim 2, wherein said charging unit charges the electric power to the drone by electromagnetic induction or magnetic resonance.

5. The charging system in accordance with claim 1, wherein said charging station further comprises:
   a control unit for controlling the drone to be flied to the charging station for charging under a control of the control station or by communication with the drone;
   a receiving unit for receiving a guide flight signal transmitted from the control station or the drone for charging;
   a transmitting unit for transmitting a guide flight signal to the drone or the control station for charging;
   a guiding unit for transmitting a radio signal to the drone to be autonomous guided to the charging station;

a displaying unit for displaying a state in which charging is performed; and a buffering unit for preventing mechanical breakage due to physical contact between the drone and the charging station when the charging of the drone is performed by wire.

6. The charging system in accordance with claim 5, wherein said guiding unit transmits a signal of infrared rays, laser beams, and RF signals to the charging station.

7. The charging system in accordance with claim 5, wherein said charging unit charges the electric power to the drone by electromagnetic induction or magnetic resonance.

8. The charging system in accordance with claim 1, wherein said drone reserves a flight plan at the control station and flies according to the flight plan under a control of the control station.

9. The charging system in accordance with claim 1, wherein said charging station comprises a hangar so that the drone can be stored or be charged.

10. The charging system in accordance with claim 9, wherein said hangar comprises:

a control unit;

a communicating unit for communicating with the drone or the control station;

a door unit for being opened or closed for charging and storing the drone;

a fixing unit for fixing the aero vehicle;

a electric power generating and storing unit for converting solar light to electric power;

a sensing unit for sensing and manages the wind direction, rain, thunderstorm, temperature, charging status, and charge amount to determine whether the flight of the drone is possible; and a memory for storing data processed by the control unit.

11. The charging system in accordance with claim 9, wherein said hangar has waterproof function.

* * * * *